Oct. 9, 1951   O. B. VETTER   2,570,410
COMPENSATED MEASURING APPARATUS
Filed Feb. 5, 1948   4 Sheets-Sheet 1

INVENTOR.
OTTO B. VETTER
BY Kegan and Kegan
ATTORNEYS

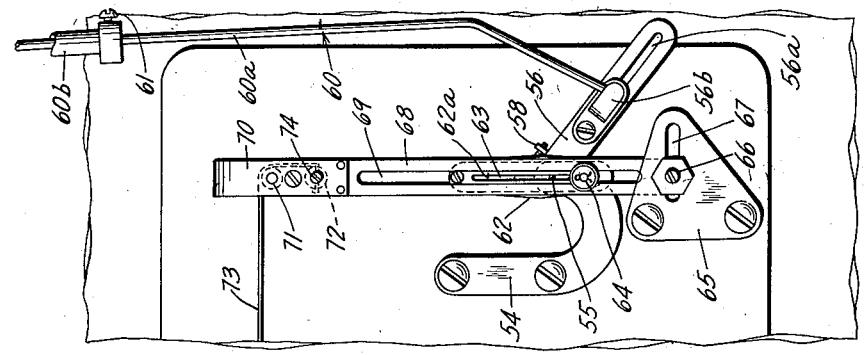
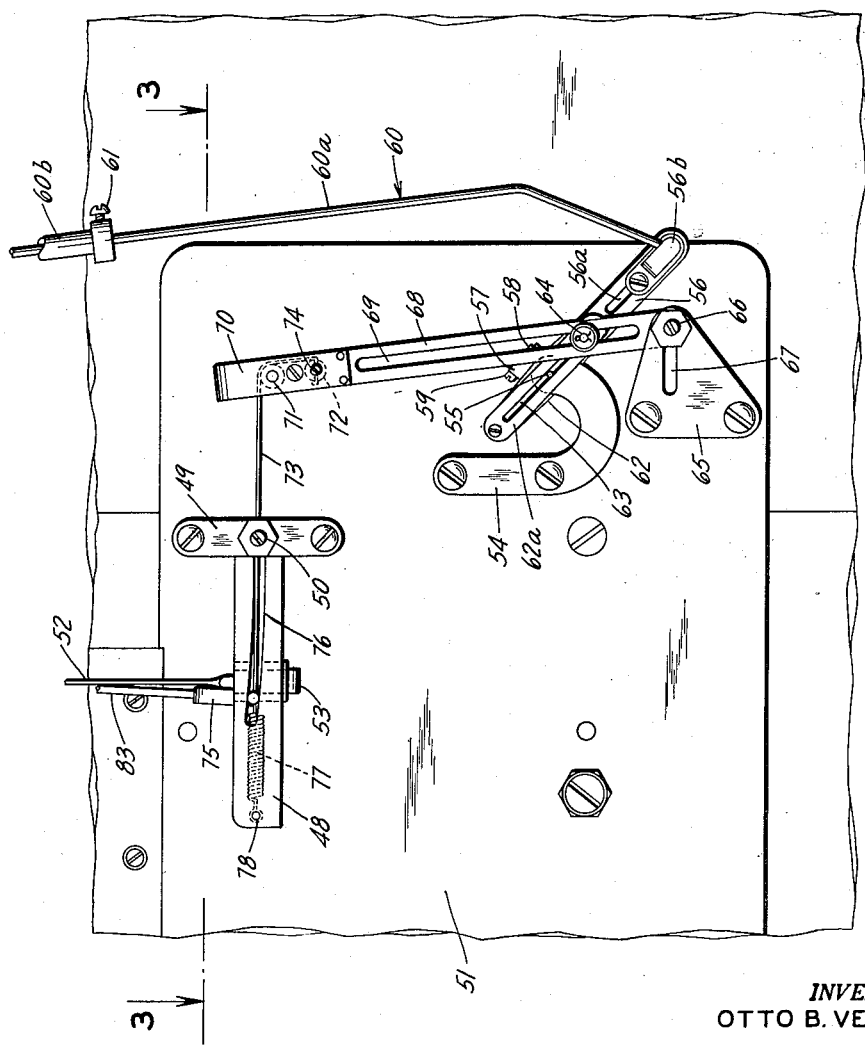

Oct. 9, 1951     O. B. VETTER     2,570,410
COMPENSATED MEASURING APPARATUS
Filed Feb. 5, 1948     4 Sheets-Sheet 3

*INVENTOR.*
OTTO B. VETTER
BY Kegan and Kegan
ATTORNEYS

Oct. 9, 1951          O. B. VETTER          2,570,410
COMPENSATED MEASURING APPARATUS
Filed Feb. 5, 1948                         4 Sheets—Sheet 4
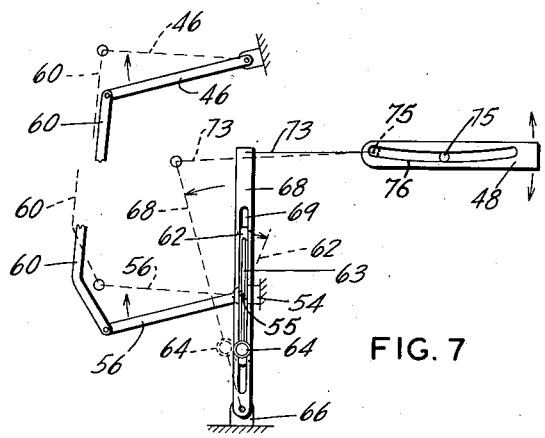
FIG. 7
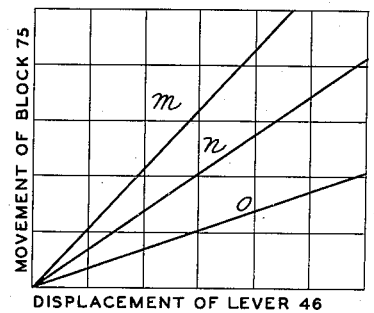
FIG. 10
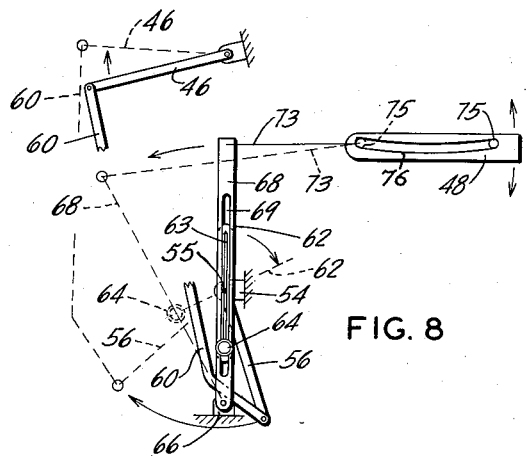
FIG. 8
FIG. 11
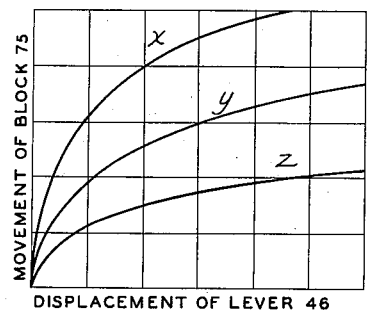
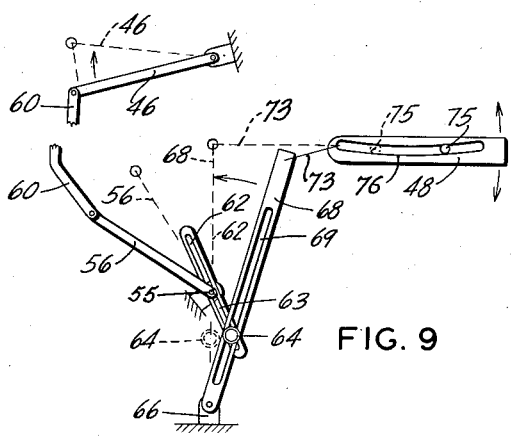
FIG. 9
FIG. 12
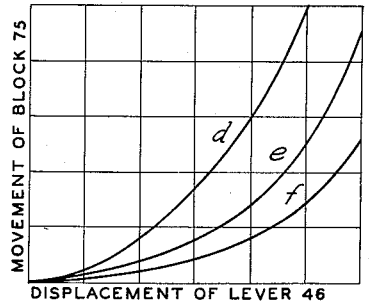
INVENTOR.
OTTO B. VETTER
BY Kegan and Kegan
ATTORNEYS

Patented Oct. 9, 1951

2,570,410

UNITED STATES PATENT OFFICE 2,570,410

COMPENSATED MEASURING APPARATUS

Otto B. Vetter, McKeesport, Pa., assignor to Hagan Corporation, Pittsburgh, Pa., a corporation of Pennsylvania Application February 5, 1948, Serial No. 6,522

19 Claims. (Cl. 74—1)

The instant invention relates to measuring devices, and particularly to improvements in motion transforming devices used in conjunction therewith for compensating a principal variable for the effects of a secondary variable.

The principal object of my invention is to provide novel measuring apparatus which accurately compensates a principal variable undergoing measurement for the effects of a secondary variable.

Another object of my invention is to provide adjustable motion transforming mechanism wherein the output motion may be made to follow accurately any function of the input motion which is within the range of functions ordinarily encountered in the compensation of one variable for the effects of another variable.

Many industrial measurement and control installations require that the principal variable undergoing measurement be corrected for the effects of secondary variables in order to isolate and exhibit the true or theoretical value of the principal variable for control and other purposes. Thus, for example, it is often desirable to know the flow of a gas in terms of specified reference or standard conditions, whereas in actual fact the prevailing conditions may be far removed from those selected. This corrected value is particularly important, for example, where gas is measured at pressures and temperatures which differ from those on which its sale is based. Where this situation exists, the apparent flow of gas, obtained generally by measuring the pressure differential created by the gas as it traverses an orifice plate or analogous primary element, may be misleading and of little practical use.

By compensating the apparent gas flow for the effect of such interfering factors as fluctuations in specific gravity, temperature and/or pressure, however, an accurate and useful measurement is obtained. In most instances, correct compensation for an interfering factor is obtained by transforming the movement exhibited by a conventional measuring element responsive to said factor into a second movement which bears the proper mathematical relation to the variable undergoing correction. Thus, for example, the magnitude of a principal variable undergoing measurement might vary inversely with the square root of a secondary variable, while the device measuring the secondary variable might deflect in proportion to changes in said variable. This motion conversion is ordinarily accomplished by means of motion transforming linkage empirically designed for the express problem encountered.

On the other hand, the general objective of my invention is to dispense with the necessity of providing a separate linkage for each type of compensation; rather the instant invention provides a universally-adjustable transforming linkage which selectively and faithfully reproduces all functions commonly encountered in instrument installations.

Stated briefly, a preferred embodiment of the present invention includes a shaft on which a pair of spaced arms are adjustably mounted, one of the arms being linked to and actuated by mechanism which measures and exhibits a corrective factor. The other arm is adjustably interconnected to a separate, rotatable lever. This latter lever in turn controls the length of a rotatable variable length arm which is displaced angularly from its null position in direct proportion to the magnitude of the uncorrected primary measurement. The manner in which this novel combination of elements promotes accurate and dependable measurements, as well as the manner in which the adjustments incorporated therewith extend its scope of application, will become clearer as this exposition proceeds.

In order that my invention may be more fully disclosed, reference is had to the accompanying drawings which illustrate one form of apparatus embodying the foregoing and such other principles, advantages or capabilities as may be pointed out as this description proceeds, or as are inherent in the present invention. For purposes of clarity in exposition, the following description is explicit, and the accompanying drawings are detailed, but it is distinctly to be understood that said exposition is illustrative only, and that my invention is not restricted to the particular details recited in the specification or shown in the drawings.

In the drawings:

Figure 2 is a fragmentary front elevational view showing a preferred embodiment of my invention;

Figure 5 is a fragmentary front elevational view of the embodiment shown in Figure 2, illustrating the adjustability thereof.

Figures 7, 8 and 9 are schematic views, taken in rear elevation of a portion of the embodiment shown in Figures 1-6, illustrating different settings whereby different compensating characteristics may be obtained;

Figure 3:
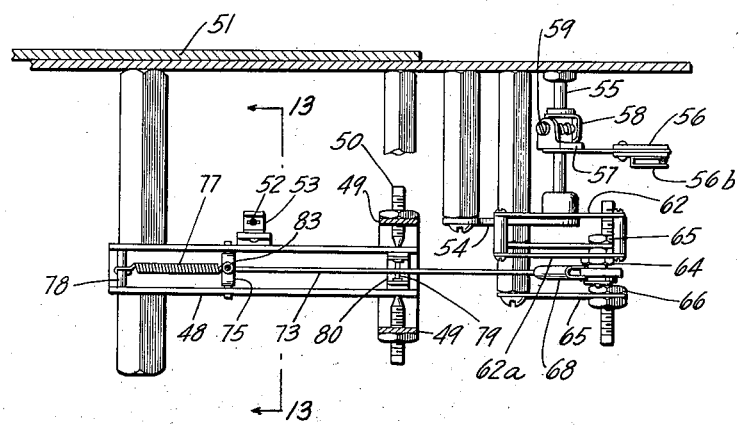
Figure 3 is a fragmentary plan view taken in section along the line 3—3 of Figure 2.
Figure 6:
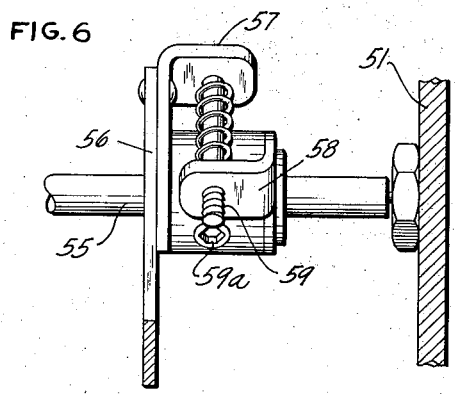
Figure 6 is a detailed fragmentary side elevational view thereof.
Figure 13:
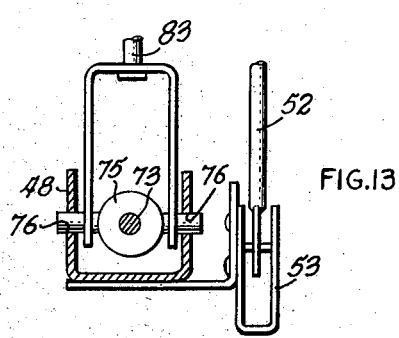

Figures 10, 11 and 12 are arithmetic plots of representative correction curves obtained through the use of the settings shown in Figures 6, 7 and 8, respectively; and Figure 13 is a fragmentary side elevational view taken in section on the line 13—13 of Figure 3.

Like reference characters designate like parts in the drawings and in the description of my invention which follows:

The advantages and capabilities of the instant invention will be more readily comprehended by first demonstrating its utility as applied to a specific measuring system and then, in the light of this disclosure, demonstrating its inherent versatility. To this end, a preferred form of my novel compensating linkage is shown in the drawings, particularly in Figure 1 thereof, as being combined with (a) a gas flow measuring element of the ring balance type and (b) a specific gravity measuring element of the ring balance type.

The gas flow measuring element, in common with conventional ring balance instruments, includes a hollow torus 10 divided by a partition 11 and a body of liquid 12 into two separate compartments which are connected through inlets 13 and 14 to the pressure taps 15, 16, respectively. Said taps 15 and 16 are connected across the primary element 17 in the conduit 18, hence any pressure differential which exists across the primary element 17 is reflected back to the compartmented torus 10. The torus 10, being fixed to an axle 19 which is hinged about a knife-edged fulcrum 20, tends to rotate due to the force unbalance which the pressure differential creates across the partition 11. As the torus 10 displaces from its null position, however, the counterweight 21 sets up a progressively increasing counter or opposing force which, when it equalizes exactly the force due to the pressure differential, fixes the torus 9 at an equilibrium position.

Figure 1:
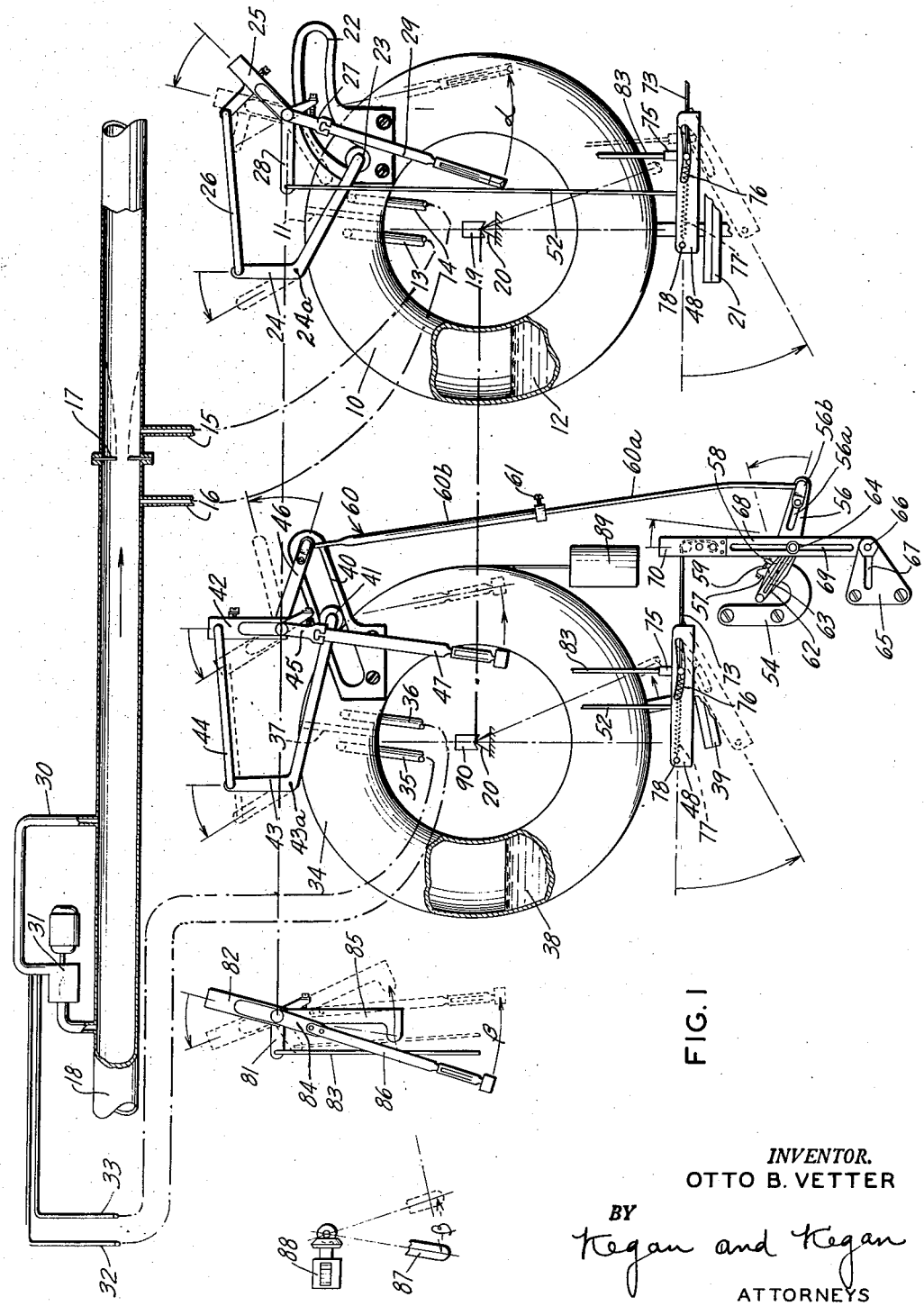
Figure 1 is a schematic view of a measuring system incorporating the instant invention.

Since the relation between pressure differential across a primary element and the flow therethrough follows a definite function (in the ideal case volumetric gas flow is directly proportional to the square root of the pressure differential), the resultant displacement of the torus 9 from its null position is a measure of the apparent gas flow. This displacement may be measured and recorded by suitable mechanism. As seen in Figure 1, a cam 22 is secured to and moves with the torus 9. Movement of the cam 22 actuates the cam follower 23, which drives a first bell crank 24 about a fixed center of rotation 24a. The bell crank 24 is linked to and drives a yoke 25 through a connecting link 26, said yoke 25 positioning a pen arm 27 and a first take-off lever 28.

In order to obtain a deflection of the pen arm 27 and the lever 28 which is proportional to the apparent gas flow, rather than to the pressure differential across the element 17, the cam follower 23 is made to follow a uniformly retarded motion. This obtains from the parabolic displacement of the cam 22, which in effect extracts the square root of the pressure differential. Thus, the pen 29 secured to the pen arm 27 records the instantaneous value of the uncorrected gas flow on a suitably calibrated chart (not shown).

As indicated above, a more accurate indication of the gas flow is obtained by compensating the uncorrected or apparent gas flow for fluctuations in specific gravity about a selected base or reference. The preferred measuring apparatus which provides this specific gravity measurement is shown in figure 1 as including a by-pass line 30 shunted across the conduit 18 upstream of the element 17, and a constant volume blower unit 31 interposed in said line 30. By inserting a primary element (not shown) in the line 30 downstream of the constant volume blower 31, a pressure differential is obtained which is directly proportional to the specific gravity of the gas. This follows from the simplified flow relation $$Q \propto \sqrt{\frac{\Delta p}{w}}$$

wherein Q is volumetric rate of flow, $\Delta p$ is the pressure differential across a suitable primary element, and $w$ is the weight density of the gas (proportional to the specific gravity of the gas). Because the value of Q through the primary element in the line 30 is constant due to the action of the constant volume blower 31, this equation may be reduced to the relation $\Delta p \propto w$, from which it is apparent that the pressure differential is a direct measure of the gas specific gravity.

Pressure taps 32 and 33 transfer this pressure differential to the torus 34 through the pressure inlets 35 and 36, respectively. Like the torus 10, the torus 34 is centrally supported by an axle 90 which bears upon a knife-edged fulcrum 20, and includes a partition 37 and a body of liquid 38. In practice it is customary to mount the torus 34 coaxially with the torus 10; however, for purposes of clarity Figure 1 shows the tori 10 and 34 separated. Similarly, the force exerted on the partition 37 by the pressure differential acts to rotate the torus 34, this movement being opposed by the displacement of the counterweight 39. The torus 34 carries a cam 40 which actuates a cam follower 41, the motion of the cam follower 41 being transmitted to a bell crank 43 pivoted on a fixed center of rotation 43a. The bell crank 43 in turn drives the yoke 42 through the connecting link 44. The yoke 42 positions a pen arm 45 and a take-off lever 46. Since the pressure differential, and hence the rotation of the torus 34, is directly proportional to the specific gravity of the gas undergoing measurement, the cam 40 is made linear; hence the pen 47 secured to the pen arm 45 records the instantaneous value of the gas specific gravity on a suitable chart (not shown).

It is apparent that the apparatus thus far described provides means for exhibiting and recording the instantaneous magnitude of (a) the uncorrected value of the flow of gas through the conduit 18 and (b) the specific gravity of said gas. The manner in which my invention integrates these two factors to obtain gas flow compensated for specific gravity is set forth in detail hereinbelow.

Figure 4:
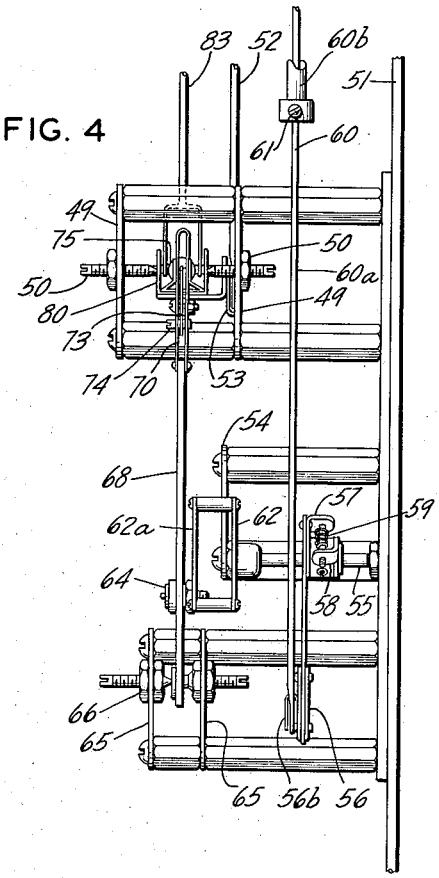
Figure 4 is a side elevational view of the embodiment shown in Figure 2.

Referring now to Figures 2 through 4, the housing 48 is pivotally mounted between and supported by the mounting plates 49, 49 and the pivot screws 50, 50 threaded therethrough. The mounting plates 49, 49 are in turn supported by the support member 51. A drive link 52 interconnects the take-off lever 28 (best shown in Figure 1), with the pivot assembly 53 anchored to the housing 48. Advantageously, the effective lever arm of the take-off lever 28 is made equal in magnitude to the effective lever arm of the pivot assembly 53 (with reference to the pivot screws 50, 50), so that the angular displacement of the housing 48 is equal to the angular displacement of the take-off lever 28. Thus, the displacement of the housing 48 from its null position is proportional to the uncorrected flow.

Referring now to Figures 2 through 6, the hooked-shaped bracket 54 supports the outer end of the shaft 55, the inner end of the shaft 55 being supported by the support member 51. A crank 56 is adjustably mounted on the shaft 55, the principal adjustment therebetween being performed by rotating the floating element 57 relative to the fixed element 58 by means of the adjusting screw 59, while a secondary adjustment may be obtained by backing off the set screw 59a and rotating the element 58 into a new position. The crank 56 is further characterized by the provision of a slot 56a along which the clip assembly 56b may be adjusted. By means of the assembly 56b, the crank 56 is pivotably linked to and driven by the lever 46 through the adjustable-length drive link 60. Adjustment of the length of the drive link 60 is performed by sliding the lower portion 60a within the tubular portion 60b to the desired position and clamping the link 60 at this position by means of the clamp screw 61. Also secured to the shaft 55 is a drive arm 62 which includes an outer member 62a. Said outer member 62a has a slot 63 therein which extends radially across the axis of the shaft 55 and which provides ways along which the slide block 64 may be adjustably positioned. Advantageously, the angularity between the crank 56 and the drive arm 62, and hence the slot 63, may be altered by rotating elements 57 and 58 relative to each other.

Also secured to the support member 51 are two spaced mounting plates 65, 65 each of which contains an adjustment slot 67. A pivot assembly 66 is adjustably positionable along the adjustment slots 67, 67 and pivotally supports a crank 68. A drive slot 69 extends along the radius arm of the crank 68 and receives the slide block 64. Secured to the outer free end of the crank 68 is a U-shaped strap 70 which supports the idler pulley 71 and the adjusting drum 72. A cable 73 is anchored at its one end to the drum 72 and rides over and is guided by the pulley 71. A slotted head screw 74 provides means for angularly positioning the drum 72. The other end of the cable 73 is secured to one side of the guide block 75, said block 75 being constrained to move along a pair of arcuate slots 76, 76 formed in opposing walls of the housing 48. The cable 73 is tensioned by a helical spring 77 which links the other side of the block 75 to the anchoring pin 78 and urges the block 75 away from the pivot screws 50, 50. A roller 79 pivotally supported by the bracket 80 supports and guides the cable 73 such that it acts through the axis of rotation of the housing 48.

As indicated above, the take-off lever 46 rotates in accordance with variations in specific gravity. As the lever 46 displaces, it drives the crank 56 and the driver arm 62, thus imparting motion to the slide block 64 and the crank 68. As the crank 68 oscillates about the pivot assembly 66 the arcuate motion of its outer free end is transformed, through the conjoint action of the cable 73 and the roller 79, into a linear motion which is imparted to the guide block 75.

Advantageously, my invention converts the movement of the take-off lever 46 into a functionally different movement at the slide block 75, which is suitable for compensating the apparent gas flow for variations in specific gravity. More exactly, the volumetric flow of gases within the ordinary engineering range of pressures and temperatures varies inversely with the square root of the specific gravity of the gas. Thus, since the displacements of the take-off levers 28 and 46 both vary directly with the respective factors being measured, it is apparent that the mathematical relation which exists between the effective corrective movements of the take-off lever 46 and the block 75 involves a minus one-half exponent.

Thus, it will be seen that the housing 48 and the slide block 75 form a rotatable variable length arm whose angular displacement from null position varies proportionally to a function of the principal factor, while the effective radius of the arm varies in proportion to a function of the secondary or corrective factor. The resultant coordinate position of the arm is thus proportional to the product of the aforesaid two functions. In the instant case the polar position of the block 75 relative to the pivot screws 50, 50 and the null position of the housing 48 reflects the magnitude of the uncorrected gas flow compensated for specific gravity.

As best illustrated in Figure 1, the block 75 is drivably connected to the arm 81 of the yoke 82 through the driven link 83. For reasons explained in detail below, the radius of curvature of each of the arcuate slots 76, 76 registers with an imaginary arc generated by the radius arm of the driven link 83 when the housing 48 is in null position. Secured to the yoke 82 are a pen arm 84 and an integrator take-off link 85. The pen arm 84 holds a pen 86 which records the deflection of the yoke arm 81 on a suitable chart (not shown). It is this deflection of the yoke arm 81, then, from its null position, which exhibits the instantaneous value of gas flow compensated for variations in specific gravity. The link 85 positions the indexing arm 87 of integrator mechanism (not shown), such as that set forth in Patent No. 2,376,108, entitled Integrator, issued to Maurice J. Zucrow on May 15, 1945. Through such integration mechanism may the aggregate simultaneous flow values be integrated and registered in suitable units on the register 88.

In operation, three sets of operating conditions are normally encountered, viz: (1) flow is either steady state or varying, with specific gravity at the selected reference value, (2) specific gravity is varying, while flow is steady state and (3) flow and specific gravity both vary. In the first circumstance, the torus 10 is displaced from its null position an amount sufficient to equalize the pressure differential across the primary element 17. Consequently, the housing 48 deflects proportional to the rate of flow, in the direction indicated in Figure 1. Since the specific gravity in this case is at the reference value, it is unnecessary to correct the flow measurement. Obviously, a pressure differential will exist across the partition 37 of the torus 34 so long as an absolute inlet pressure to the constant volume blower unit 31 exists. Also, the gas pressure in most installations is above atmospheric, with the actual variation in pressure (which reflects the variation in specific gravity) comprising only a comparatively small portion of the absolute pressure within the conduit 18. Thus to secure sensitivity in compensation it is desirable to construct the compensating apparatus with a range of the same order of magnitude as the expected fluctuation in specific gravity. This property is effected by attaching a suppression weight 89 to the torus 34, thus suppressing the rotation of the torus 34 until the bottom limit of the specific gravity range is reached. In practice, the weight 89 and the adjustment of the linkage between the lever 46 and the cable 73 should be such that the lever arm of the block 75 is equal to the effective lever arm of the yoke arm 81 when the specific gravity is at the selected reference value. When the block 75 is in this position, the angular deflection of the yoke arm 81 follows exactly the angular deflection of the take-off lever 28. Thus the pen 86, which records the corrected gas flow, registers the same flow value as the pen 29, which records the uncorrected gas flow.

In the second circumstance listed above, however, the displacement of the housing 48 from its null position remains essentially fixed, while the specific gravity of the gas varies about the reference value selected. This variation in specific gravity causes a proportional variation in the pressure differential across the primary element in the line 30. This variation in pressure differential is in turn reflected back to the compartmented torus 34, and acts to reposition the torus 34 at a new equilibrium position. These variations are recorded directly by the pen 47, while the interconnected linkage from the take-off lever 46 to the cable 73 changes the position of the block 75 along the slots 76 in the manner indicated above. Movement of the block 75 repositions the pen 86 and the integrator take-off link 85 to the new equilibrium position, thus altering the magnitude of both the instantaneous and the aggregate flow readings. If the gas flow through the conduit 18 should for any reason equal zero, however, variations in the specific gravity of the gas would have no effect upon the final register. This feature obtains from the particular curvature of the arcuate slots 76, 76, specified above in combination with the null or zero position of the housing 48. Thus, the link 83 may oscillate as the specific gravity fluctuates without having any effect whatsoever upon the yoke arm 81, so long as the housing 48 is in the position shown in Figure 1 and the radius of curvature of the slots 76, 76 equals the length of the link 83.

While it would be unusual to encounter the foregoing situation in actual operation, since the factors which influence the specific gravity of a gas also affect the volumetric flow thereof, such an illustration is nevertheless useful in clarifying the action of each component of my invention when operating under the conditions normally encountered, namely: gas flow and specific gravity both fluctuating.

Actually, the action of the various elements under this condition may be thought of as being a combination of those encountered in the two situations just discussed. Thus, when both flow and specific gravity increase, the linkage of the apparatus shown in Figure 1 deflects in the direction indicated in dotted outline.

It will be seen, however, that increasing the specific gravity reduces the lever arm of the block 75 and that as a result the angular displacement $\beta$ of the pen 86, which reflects the true gas flow, is less than the angular displacement $a$ of the pen 29, which is a measure of the apparent gas flow. That the value of the corrected volumetric flow should not increase proportionately as great as the uncorrected volumetric flow under these conditions is borne out by the fact that the specific gravity of a gas varies inversely with the specific volume thereof, while the volumetric flow varies directly with the square root of the specific volume (assuming a perfect gas). Thus, if specific gravity increases, specific volume decreases and the corrected volumetric gas flow is lower than the uncorrected value. The rate of flow of of the gas based on weight, rather than volume, will of course increase under this set of operating conditions. Conversely, if the specific gravity were to decrease, the force impressed upon the block 75 by the resultant movement of the torus 34 would act to increase the lever arm of said block 75 and thereby increase the magnitude of the corrected volumetric flow.

Thus far I have described in detail the manner in which my invention may be used to compensate apparent volumetric gas flow for variation in specific gravity of the gas. Basically, this transformation involves mathematical extraction of the magnitude of the specific gravity to the minus one-half power. Advantageously, the instant invention is also fully capable of generating countless other exponential relations between the function of an input corrective impulse and the function of an output corrective impulse. To achieve the exact motion translation required, the present invention includes a novel combination of adjustments whereby the various components comprising my compensating linkage may be accurately positioned relative to each other. Functionally, these adjustments may be separated into three main classifications, namely: (1) those which alter the shape of the basic correction curve; (2) those which change the amplitude of the basic correction curve; and (3) those which govern whether the corrective variable affects the principal factor directly or inversely. By basic correction curve is meant the plot of the mathematical relation which exists between the impulse imparted to the compensating linkage and the corrective impulse obtained therefrom.

In actual practice, the basic correction curve is most easily altered either by changing the angularity between the crank 56 and the lever 46, or by varying the angularity between the drive arm 62 and the crank 68, the angularity referred to being that which is defined by the foregoing elements when the measuring apparatus is in the null (or other reference) position. The exact position desired is readily obtained either by adjusting the element 56 relative to the element 58, or by shifting the pivot assembly 66 along the adjustment slot 67, or by a combination of the two. While these adjustments make it possible to obtain the requisite angularity between the crank 56, the drive arm 62 and the crank 68, it follows that the length of the drive link 60 and the length of the cable 73 must be changed so as to bring the system back to the null or reference position. Under some circumstances, it may also be necessary to re-position the element 58 relative to the shaft 55.

On the other hand, the amplitude of the basic correction curve may be changed either by varying the position of the slide block 64 along the slot 63, thereby effectively changing the radius arm of the outer portion 62a, or by moving the clip assembly 56b along the slot 56a, thereby increasing or decreasing the radius arm of the crank 56. In addition, the amplitude of the correction curve may be altered a small amount by changing the position of the pivot assembly 66 along the slot 67.

Through the use of my novel mechanism, it is also possible to choose whether the corrective variable is to be applied inversely or directly to the principal variable. Thus, for example, when the principal variable varies inversely with the factor for which it is being compensated, it is apparent that the corrected or true reading should decrease for any increase in the corrective factor. On the other hand, if the principal factor should vary directly with the factor for which it is being compensated, then the resultant true value should increase. In actual practice these two methods of applying the corrective factor are realized by controlling the direction in which the guide block 75 moves as the corrective factor increases. Thus, by way of a concrete example, when volumetric flow is measured with the apparatus shown in Figure 1, the guide block 75 moves toward the pivot screws 50 as the specific gravity increases. On the other hand, were weight rate of flow to be measured, then the guide block 75 would have to move away from the pivot screws 50. To change the manner in which the corrective factor is being applied, one of two methods is preferably used. Either the slide block 64 is moved along the slot 63 to the other side of the shaft 55, i. e. in effect displaced 180°—or else the drive arm 62 and the outer portion 62a are re-positioned so that the limits of the arcuate travel of the slide block 64 are displaced approximately 180°.

Figure 7 illustrates schematically one manner in which the embodiment shown in Figures 1 through 5 may be set. Advantageously, when the null position of the compensating linkage is as shown in full line in Figure 7, the resultant correction curve is essentially linear in its function. When the apparatus is adjusted to this position, the take-off lever 46 is parallel to the crank 56, and thus the crank 56, the drive arm 62, the outer portion 62a, and the slide block 64 all follow within close limits the movement of the take-off lever 46. Inasmuch as the crank 68 typically deflects through only a very small angular deflection, the motion of the guide block 75 also follows within close limits the motion imparted to the take-off lever 46. An exemplary arithmetic plot of this motion is designated $m$ in Figure 10. As explained above, the amplitude of the correction curve may be varied either by moving the block 64 along the slot 63, by moving the clip assembly 56b along the slot 56a, or by a combination of the two. Exemplary curves obtained solely through these latter adjustments are shown at $n$ and $o$ in Figure 10.

As an illustration of the applicability of the foregoing setting of the compensating linkage, the compensation of gas flow for specific gravity, where the molecular weight of the gas is comparatively high, may be mentioned. While theoretically the plot of specific gravity versus correction follows a square root function as specific gravity increases from the zero value, actually, the curve flattens out at comparatively high values of specific gravity and for small increments thereof approaches a straight line function. Inasmuch as the range of the specific gravity measuring element ordinarily is limited to such small increments, the actual compensation required more nearly approaches a linear function than a square root function. Thus, the compensating linkage shown in Figure 5 accurately compensates the flow measurement of high molecular weight gases for variations in specific gravity.

Whereas the compensating linkage shown in Figures 1-4 retains the parallelism between the crank 56 and the lever 46, the pivot assembly 66 of the crank 68 has been displaced away from the vertical plane passing through the axis of rotation of the shaft 55. Consequently, an angularity factor is introduced into the system which causes the correction curve to deviate somewhat from the linear function shown in Figure 10.

On the other hand, where the relation between the compensating factor and the principal factor is more or less parabolic, as would be the case where low molecular weight gases such as hydrogen are being measured, then the arrangement shown in Figure 8 is of special utility. More particularly, Figure 8 shows the crank 56 as being perpendicular to the lever 46 when the linkage is at the lower limit of the compensating range (depicted in full line). Within the limits of deflection for which measuring devices of this type are ordinarily set, the plot of the movement of the guide block 75, in relation to the movement of the take-off lever 46, follows closely a parabolic function. In actual practice, it is not practical to set the crank 56 exactly perpendicular to the take-off lever 46 inasmuch as a dead center condition would obtain; however, comparable results are achieved by setting the crank 56 very close to its dead center position. Exemplary curves $x$, $y$, and $z$ generated by the arrangement of Figure 8 are plotted at Figure 11.

Yet another family of curves may be obtained by utilizing the arrangement shown in Figure 9, in which arrangement the crank 56 and lever 46 are positioned such that they are essentially perpendicular at the upper limit of the compensation range. Whereas in Figure 11 the plot of the movement of the block 75 is approximately equal to the square root of the plot of the movement of the lever 46, in Figure 12 the plot of the movement of the block 75 is approximately equal to the square of the movement of the lever 46. As before, the amplitude of this correction curve may be varied so as to obtain a family of curves exemplified by the curves $d$, $e$, and $f$.

Obviously, other settings intermediate those shown in Figures 7, 8 and 9 may be used to obtain other desirable correction characteristics. In general, these alternate correction characteristics are most easily obtained by re-positioning the crank 56 relative to the lever 46. Other adjustments may be used, however. By way of example, were the pivot assembly 66 of Figure 8 to be moved such that the crank 68 remained in vertical position (which would necessitate moving the drive arm 62 and the outer portion 62a away from the vertical position shown), then the resultant correction curve would be somewhat flatter than that shown in Figure 11.

Through these novel adjustments, then, it becomes possible to obtain the requisite basic correction curve which conforms to the particular problem at hand. In general, I have found that the arrangements shown in Figures 7 through 9, and modifications thereof, generate basic correction curves all of which conform closely to the generic equation $y = kx^n$, wherein $x$ represents the motion imparted to the lever 46 by the compensating measuring device, as for example the torus 34 and its dependent mechanism; $y$ represents the travel of the block 75 along the radius arm of the housing 43; $k$ is an "adjustable" constant which reflects the amplitude of the correction curve; and the exponent $n$ has representative values $\frac{1}{2} \leq n \leq 2$ and $$-\frac{1}{2} \geq n \geq -2$$

Whether the sign of the exponent $n$ takes the positive or negative value with respect to the principal variable will, of course, depend upon the manner in which the block 75 moves as the compensating factor changes, for the reasons discussed above.

While I have shown how the correction curve may be analyzed in terms of a generic, algebraic equation, certain trigonometric relations, as for example a versine or harmonic relation, may also be readily obtained through the use of my invention. Nevertheless, this illustrative equation serves to point out the wide range of applicability inherent to my novel compensating linkage. Advantageously, any transformation characteristic within this wide and useful range may be obtained quickly and easily by means of the novel adjustments provided. When the correction curve which is required corresponds with one of those shown in Figures 10, 11 and 12, it may be obtained by arranging the geometry of the elements of my invention in the manner indicated in Figures 7, 8 and 9, respectively. Advantageously, these same arrangements (along with their corresponding curves), serve as guide posts for obtaining correction curves which are intermediate those shown, the exact curve desired being arrived at by means of conventional calibration methods.

It will be apparent to those skilled in the art that some of the foregoing adjustment features may be omitted from my invention without in any way impairing its ability to provide accurate compensation. I have shown, for example, that the amplitude of the basic correction curve may be shifted either by adjusting the assembly 56b along the slot 56a, or by changing the effective lever arm of the slide block 64. By employing both of these adjustments it of course becomes possible to obtain a more extensive range than would be the case if one were omitted; however, in some installations it may prove unnecessary to provide such an extensive range of amplitude.

Thus I have demonstrated the utility of my invention by explicitly pointing out its applicability to the correction of gas flow for variations in specific gravity. In addition, I have shown how my invention may be used to reproduce substantially all other transformation characteristics normally encountered in the instrumentation art. It is therefore apparent that the objects of my invention, as set forth hereinabove, have been fully achieved by the motion transformer illustrated and described. It is to be distinctly understood, however, that the apparatus shown and described herein is a preferred embodiment which has been given by way of example only, and that various changes and rearrangements of the details shown may be made without departing from the spirit of the invention, the scope of which is defined in the appended claims.

I claim:

1. In a measuring instrument responsive to the uncorrected magnitude of a principal variable, a housing pivoted at one end and including a member constrained to move along substantially the lever arm of said housing, mechanism for angularly positioning said housing in accordance with a function of said principal variable; means responsive to a second variable affecting said principal variable, said means controlling the position of said member relative to the pivoted end of said housing in accordance with a function of said second variable, said means comprising: linkage positioned in accordance with a function of said second variable, a crank actuated by said linkage, a first pivot and a first lever mounted thereon, drive means interconnecting said crank and said first lever, means for adjusting the effective length of said drive means, a second lever connected coaxially with said first lever, means for adjusting the angularity between said first and second levers, a second pivot and a third lever turning thereon, said third lever having a drive slot therein, a coupling member adjustably positionable along said guide means and drivably engaging said drive slot, connecting means drivably linking said third lever with said member on said housing, and exhibiting means operatively connected to said member whereby the position of said exhibiting means is controlled in accordance with the magnitude of said principal variable as corrected for the effect of said second variable.

2. In a measuring instrument responsive to the uncorrected magnitude of a principal variable, a housing pivoted at one end and including a member constrained to displace along substantially the lever arm of said housing, mechanism for angularly positioning said housing in accordance with a function of said principal variable, means responsive to a second variable affecting said principal variable, said means controlling the position of said member relative to the pivoted end of said housing in accordance with a function of said second variable, said means comprising: a pivoted member positioned in accordance with a function of said second variable, a frame, a first pivot on said frame, a first crank mounted on said first pivot, pivot means adjustable along said first crank, an adjustable length connecting rod between said pivoted member and said first pivot means, a second crank coaxial with and drivably connected to said first crank, a second pivot on said frame and a crank member mounted on said second pivot, means for adjusting the position of at least one of said pivots relative to said frame, guide means disposed along the length of said crank member, a follower on said second crank, said follower being constrained to move along said guide means, connecting means drivably linking said crank member with said member on said housing, and exhibiting means operatively connected to said member whereby the position of said exhibiting means is controlled in accordance with the magnitude of said principal variable as corrected for the effect of said second variable.

3. In a measuring instrument responsive to the uncorrected magnitude of a principal variable, a housing pivoted at one end and including a member constrained to move substantially along the lever arm of said housing, mechanism for angularly positioning said housing in accordance with a function of said principal variable, means responsive to a second variable affecting said principal variable, said means controlling the position of said member relative to the pivoted end of said housing in accordance with a function of said second variable, said means comprising: a pivoted member positioned in accordance with a function of said second variable, a first pivot and a crank mounted thereon, a drive member interconnecting said pivoted member and said crank, means for adjusting the length of said drive member, an arm coaxial with and drivably connected to said crank, a second pivot and a crank member mounted thereon, guide means on said crank member, a follower on said second crank, said follower being constrained to move along said guide means, connecting means drivably linking said crank member with said member on said housing, and exhibiting means operatively connected to said member on said housing whereby the position of said exhibiting means is controlled in accordance with the magnitude of said principal variable as corrected for the effect of said second variable.

4. A motion converting linkage comprising a first pivot and a first crank turning thereon, means for positioning said first crank, a second pivot and a second crank turning thereon, said second crank having a slot therealong, a pivot assembly adjustable along said slot, an adjustable length link interconnecting said first crank and said pivot assembly, an arm pivoted about said second pivot and drivably connected to said second crank, means for adjusting the angularity between said second crank and said arm, said arm having a guide slot therein disposed along the lever arm thereof, a coupling member adjustably movable along said guide slot, a stationary mounting plate having a pivot slot therein, pivot means adjustably movable along said pivot slot, a lever turning about said pivot means and having a drive slot therein disposed along the lever arm thereof, said coupling member being positioned within said drive slot and movable therealong, and means positioned by said lever.

5. A motion converting linkage comprising a first pivot and a first crank turning thereon, means for positioning said first crank, a second pivot and a second crank turning thereon, an adjustable length link interconnecting said first crank and said second crank, an arm pivoted about said second pivot and drivably connected to said second crank, means for adjusting the angularity between said second crank and said arm, said arm having a guide slot therein disposed along the lever arm thereof, a coupling member adjustably movable along said guide slot, a stationary mounting plate having a pivot slot therein, pivot means adjustably movable along said pivot slot, a lever turning about said pivot means and having a drive slot therein disposed along the lever arm thereof, said coupling member being positioned within said drive slot and movable therealong, and means positioned by said lever.

6. Motion converting mechanism, comprising a first pivot and a first crank turning thereon, means for positioning said first crank in accordance with variations of a first variable, a rotatable shaft and a second crank secured thereof, an adjustable length link drivably interconnecting said first crank and said second crank, an arm secured to said shaft, means for adjusting the angularity between said second crank and said arm, guide means on said arm extending along the radius arm thereof, a slide block positionable along said guide means, a second pivot and a lever turning thereon, means for adjusting the position of said second pivot relative to said shaft, other guide means on said lever along the lever arm thereof, said slide block being constrained to move along said other guide means, a third pivot and a housing pivotally mounted thereon, means for positioning said housing in accordance with the magnitude of a second variable, a member movable along said housing, a cable interconnecting said lever with said member, said cable acting through the axis of rotation of said housing, and means linked to and positioned by said member, whereby said second variable is compensated for variations in said first variable.

7. Motion converting linkage comprising a shaft and a collar adjustably secured thereto, a bracket member rotatable about said shaft, screw means interconnecting said collar and said bracket member whereby the angularity therebetween may be adjusted, a first crank carried by said bracket member, a pivot assembly adjustable along the radius arm of said first crank, a pivoted member and means for positioning the same, an adjustable length connecting rod linking said pivot assembly and said pivoted member, an arm secured to and driven by said shaft, guide means on said arm traversing the axis of rotation thereof, a first pivot and a lever mounted thereon, said lever having a drive slot therein, a coupling member adjustable along said guide means and drivably engaging said drive slot, means for adjusting the position of said first pivot relative to said shaft, and means positioned by said lever.

8. Motion converting linkage comprising a shaft and a collar adjustably secured thereto, a bracket member rotatable about said shaft, means interconnecting said collar and said bracket member for adjusting the angularity therebetween, a first crank carried by said bracket member, a pivoted member, and adjustable length connecting rod linking said crank and said pivoted member, an arm secured to and driven by said shaft, guide means on said arm traversing the axis of rotation thereof, a first pivot and a lever mounted thereon, said lever having a drive slot therein, a coupling member adjustable along said guide means and drivably engaging said drive slot, and means positioned by said lever.

9. In a measuring device or the like, mechanism responsive to a first variable, a first pivot and a housing turning thereon, said housing being angularly positioned by said mechanism in accordance with a function of said first variable; other mechanism responsive to a second variable, a pivoted member angularly positioned by said other mechanism in accordance with a function of said second variable; and means whereby said function of said second variable is transformed and superposed on said function of said first variable, said means comprising: a lever pivoted at one end thereof, adjustable length connecting means between said pivoted member and said lever, a first crank coaxial with and driven by said lever, said first crank having guide means thereon, a second pivot and a second crank turning thereon, said second crank having a drive slot therein, a coupling member adjustably positionable along said guide means and drivably engaging said drive slot, a guide member movable along said housing relative to said first pivot, a cable interconnecting said guide member with the outer end of said second crank, and other means positioned by said guide member.

10. A motion transformer which includes a first pivot and a first lever turning thereon, means for positioning said first lever, a second pivot and a crank turning thereon, an adjustable length link interconnecting said first lever and said crank, an arm pivoted about said second pivot and drivably connected to said second crank, means for adjusting the angularity between said second crank and said arm, a coupling member on said arm, a third pivot and a second lever turning thereon, means for adjusting the position of said third pivot relative to said second pivot, said second lever including guide means disposed along substantially the lever arm thereof, said coupling member being constrained to follow said guide means, and means positioned by said second lever.

11. A motion transformer comprising a first pivot and a first lever turning thereon, means for positioning said first lever, a second pivot and a second lever turning thereon, a trunnion member adjustable along said second lever, an adjustable length link interconnecting said first lever and said trunnion member, a crank coaxial with and driven by said second lever, a stationary mounting member perpendicular to the axis of rotation of said second pivot and having a positioning slot therein, a pivot assembly positionable along said positioning slot, a third lever turning on said pivot assembly and having a slot along the radius arm thereof, slide means movable along said slot and secured to and driven by said crank, and means positioned by said third lever.

12. A motion transformer which includes a first pivot and a crank pivotally mounted thereon, a pivoted member and means for positioning the same, adjustable length connecting means between said pivoted member and said crank, an arm coaxial with said crank and drivably connected thereto, said arm having a slot therein positioned to traverse the axis of rotation thereof, a second pivot and a lever pivotally mounted thereon, guide means positioned along the length of said lever, a follower adjustably positionable along said slot and constrained to displace along guide means, and means positioned by said lever.

13. A motion transformer comprising a first pivot and a first lever turning thereon, means for positioning said first lever, a second pivot and a second lever turning thereon, an adjustable length link interconnecting said first lever and said second lever, a crank coaxial with and driven by said second lever, a stationary mounting member perpendicular to the axis of rotation of said second pivot and having a positioning slot therein, a pivot assembly positionable along said positioning slot, a third lever turning on said pivot assembly and having a slot along the radius arm thereof, slide means movable along said slot and secured to and driven by said crank, and means positioned by said third lever.

14. A motion transformer comprising a first pivot and a first lever turning thereon, means for positioning said first lever, a second pivot and a second lever turning thereon, an adjustable length link interconnecting said first lever and said second lever, a crank coaxial with and driven by said second lever, a third pivot, a third lever turning on said third pivot and having a slot along the radius arm thereof, slide means movable along said slot and secured to and driven by said crank, and means positioned by said third lever.

15. In a measuring device including a pivoted member and means for positioning the same, motion transforming apparatus comprising a first pivot and a first crank turning thereon, an adjustable length link interconnecting said first crank and said pivoted member, a second crank pivoted about said first pivot and drivably connected to said first crank, a second pivot and a lever turning thereon, guide means disposed along the length of said lever, a coupling member secured to said second crank and drivably engaging said guide means, and means positioned by said lever.

16. In measuring apparatus including a pivoted element positioned in response to a function of one or more variables being measured, a motion transformer comprising: a member and means supporting said member for rotation about an axis, a pivot assembly on a first portion of said member, means for adjusting the position of said pivot assembly along substantially the radius arm of said first portion, an adjustable length link between said pivoted element and said pivot assembly, a follower, means for adjusting the position of said follower on a second portion of said member relative to said axis thereof, a rotatable link including guide means positioned substantially along a radius arm thereof, said follower constrained to movement along said guide means, and means positioned by said rotatable link.

17. In measuring apparatus including a pivoted element positioned in response to a function of one or more variables being measured, a motion transformer comprising: a member and means supporting said member for rotation about an axis, linkage between said element and a first portion of said member, means for adjusting the angularity between said element and said first portion of said member, a follower, means for adjusting the position of said follower on a second portion of said member relative to said axis thereof, means for adjusting the angularity between said follower and said first portion of said member, a rotatable link including guide means positioned substantially along a radius arm thereof, said follower constrained to movement along said guide means, and means positioned by said rotatable link.

18. In measuring apparatus including an element positioned in response to a function of one or more variables being measured, a motion transformer comprising: a member and means supporting said member for rotation about an axis, linkage between said element and a first portion of said member, means for adjusting said linkage to vary the relative positions of said element and said first portion, whereby the relation between the motions of said element and said first portion may be other than linear, a follower, means for adjusting the position of said follower on a second portion of said member relative to said axis thereof, a rotatable link including guide means positioned substantially along a radius arm thereof, said follower constrained to movement along said guide means, and means positioned by said rotatable link.

19. In measuring apparatus including an element positioned in response to a function of one or more variables being measured, a motion transformer comprising: a member and means supporting said member for rotation, linkage between said element and a first portion of said member, a follower secured to a second portion of said member, a rotatable link including guide means positioned substantially along a radius arm thereof, said member constrained to movement along said guide means, and means positioned by said rotatable link.

OTTO B. VETTER.

REFERENCES CITED

The following references are of record in the file of this patent:

UNITED STATES PATENTS

| Number | Name | Date |
|---|---|---|
| 1,307,704 | Sather | June 24, 1919 |
| 1,953,406 | Hodgson et al. | Apr. 3, 1934 |
| 1,990,633 | Brandl | Feb. 12, 1935 |
| 2,205,651 | Hoffman et al. | June 25, 1940 |
| 2,402,321 | Enger et al. | June 18, 1946 |
| 2,417,966 | Binckley | Mar. 25, 1947 |
| 2,481,496 | Brewer | Sept. 13, 1949 |
| 2,526,726 | Brown | Oct. 24, 1950 |

FOREIGN PATENTS

| Number | Country | Date |
|---|---|---|
| 435,142 | Great Britain | Sept. 16, 1935 |
| 456,068 | Great Britain | Nov. 3, 1936 |